United States Patent
Cummins et al.

(10) Patent No.: US 12,397,558 B2
(45) Date of Patent: Aug. 26, 2025

(54) DELIVERY TRAY FOR FOOD PRODUCT PRINTER

(71) Applicant: Primera Technology, Inc., Plymouth, MN (US)

(72) Inventors: Robert P. Cummins, Deephaven, MN (US); Todd Britz, Maple Grove, MN (US); Erick Hagstrom, Wayzata, MN (US)

(73) Assignee: Primera Technology, Inc., Plymouth, MN (US)

( * ) Notice: Subject to any disclaimer, the term of this patent is extended or adjusted under 35 U.S.C. 154(b) by 392 days.

(21) Appl. No.: 16/985,836

(22) Filed: Aug. 5, 2020

(65) Prior Publication Data
US 2021/0059290 A1    Mar. 4, 2021

Related U.S. Application Data

(60) Provisional application No. 62/894,323, filed on Aug. 30, 2019.

(51) Int. Cl.
*B41J 3/407*     (2006.01)
*A21D 13/24*     (2017.01)
(Continued)

(52) U.S. Cl.
CPC .......... *B41J 2/17563* (2013.01); *A21D 13/24* (2017.01); *A21D 13/80* (2017.01); *A23P 20/18* (2016.08);
(Continued)

(58) Field of Classification Search
CPC ........................ B41J 3/40731; A23P 2020/253
See application file for complete search history.

(56) References Cited

U.S. PATENT DOCUMENTS 4,339,993 A    7/1982   Lee
4,632,028 A *   12/1986   Ackley .................. A61J 3/074
                                                       198/397.06
(Continued)

FOREIGN PATENT DOCUMENTS

CN        1868754 A    11/2006
CN     201325212 Y    10/2009
(Continued)

OTHER PUBLICATIONS

Search Report issued for related EP patent application serial No. 20856725.5, dated Oct. 4, 2022.
(Continued)

*Primary Examiner* — Andrew D Graham
(74) *Attorney, Agent, or Firm* — Westman, Champlin & Koehler, P.A.; Z. Peter Sawicki; Amanda M. Prose

(57) ABSTRACT

A delivery tray, system, and method for automatically delivering food product to a printer for printing on a surface of the food product. The tray has a main body having a plurality of food product support surfaces spaced apart on the main body and each food product support surface configured for supporting one of a plurality of food products thereon and the main body further comprising at least one positioning mechanism corresponding to each of the plurality of food product support surfaces and each positioning mechanism comprising at least one positioning element for guiding the loading of at least one of the plurality of food products onto the delivery tray. The tray is coupled to a motorized base for automatic movement of the tray.

6 Claims, 8 Drawing Sheets

(51) Int. Cl.
  *A21D 13/80* (2017.01)
  *A23P 20/18* (2016.01)
  *A23P 20/20* (2016.01)
  *B29C 64/00* (2017.01)
  *B41J 2/17* (2006.01)
  *B41J 2/175* (2006.01)
  *B41J 13/00* (2006.01)
  *B41J 29/02* (2006.01)
  *B41J 29/17* (2006.01)
  *B41M 5/00* (2006.01)
  *A23P 20/25* (2016.01)

(52) U.S. Cl.
  CPC ............. *A23P 20/20* (2016.08); *B29C 64/00* (2017.08); *B41J 2/1714* (2013.01); *B41J 2/1721* (2013.01); *B41J 3/407* (2013.01); *B41J 3/4073* (2013.01); *B41J 3/40731* (2020.08); *B41J 13/0009* (2013.01); *B41J 29/02* (2013.01); *B41J 29/17* (2013.01); *B41M 5/0041* (2013.01); *B41M 5/0047* (2013.01); *A23P 2020/253* (2016.08)

(56) References Cited

U.S. PATENT DOCUMENTS

| | | | | |
|---|---|---|---|---|
| 4,910,661 | A * | 3/1990 | Barth | A21C 15/002 700/66 |
| 4,981,074 | A | 1/1991 | Machita et al. | |
| 5,505,775 | A * | 4/1996 | Kitos | A21C 15/002 426/104 |
| 5,795,395 | A | 8/1998 | Ben-Matitayhu et al. | |
| 5,988,787 | A | 11/1999 | Watanabe et al. | |
| 6,230,073 | B1 * | 5/2001 | Kofman | A23G 1/50 426/87 |
| 6,245,386 | B1 * | 6/2001 | Felker | A63B 37/0022 427/407.1 |
| 6,280,785 | B1 * | 8/2001 | Yang | B33Y 30/00 425/375 |
| 6,923,115 | B1 * | 8/2005 | Litscher | B41J 3/40731 101/DIG. 40 |
| 7,114,445 | B2 * | 10/2006 | Ackley, Jr. | B41F 17/30 101/485 |
| 7,625,198 | B2 * | 12/2009 | Lipson | B33Y 50/00 425/375 |
| 9,120,300 | B2 * | 9/2015 | Moehringer | B41J 3/4073 |
| 9,710,901 | B2 * | 7/2017 | Seo | B23K 26/0823 |
| 10,231,477 | B1 * | 3/2019 | Salvatori | B33Y 40/00 |
| 2001/0005522 | A1 * | 6/2001 | Stewart | A23G 3/28 426/305 |
| 2001/0046535 | A1 * | 11/2001 | Bowling | A23G 3/2092 426/87 |
| 2003/0161913 | A1 * | 8/2003 | Stewart | A21D 13/48 426/87 |
| 2004/0031410 | A1 * | 2/2004 | Harris | B44C 5/06 101/483 |
| 2004/0114192 | A1 | 6/2004 | Jensen | |
| 2005/0088693 | A1 * | 4/2005 | Schnoebelen | A23G 3/28 358/1.18 |
| 2006/0119628 | A1 | 6/2006 | Kofman et al. | |
| 2006/0160250 | A1 * | 7/2006 | Bonassar | B33Y 40/00 438/1 |
| 2007/0231435 | A1 * | 10/2007 | Ream | A23G 3/2092 426/383 |
| 2008/0152756 | A1 * | 6/2008 | Ream | A23G 3/0097 53/493 |
| 2008/0254172 | A1 * | 10/2008 | Woodhouse | A21D 13/47 426/573 |
| 2009/0021548 | A1 | 1/2009 | Suzuki et al. | |
| 2009/0074928 | A1 * | 3/2009 | Pikalo | B41J 3/407 118/46 |
| 2009/0250316 | A1 | 10/2009 | Gaetano et al. | |
| 2009/0256897 | A1 | 10/2009 | Polk et al. | |
| 2010/0091054 | A1 | 4/2010 | Vesanto et al. | |
| 2011/0025735 | A1 | 2/2011 | Nohilly et al. | |
| 2011/0236552 | A1 * | 9/2011 | Vink | A21B 5/03 99/334 |
| 2012/0036046 | A1 * | 2/2012 | Anderson | G06Q 30/0641 358/1.9 |
| 2012/0141636 | A1 | 6/2012 | Ackley, Jr. et al. | |
| 2012/0328747 | A1 * | 12/2012 | Levy | A23G 3/0257 222/23 |
| 2013/0089642 | A1 * | 4/2013 | Lipson | B33Y 10/00 426/115 |
| 2014/0234500 | A1 * | 8/2014 | Mitchell | B41F 17/001 426/302 |
| 2017/0334595 | A1 | 11/2017 | Saccardi | |
| 2021/0060989 | A1 * | 3/2021 | Hagstrom | A21D 13/24 |

FOREIGN PATENT DOCUMENTS

| | | |
|---|---|---|
| CN | 105346266 A | 2/2016 |
| CN | 207128411 U | 3/2018 |
| EP | 0183611 A2 | 6/1986 |
| EP | 2738119 A1 | 6/2014 |
| EP | 3332978 A1 | 6/2018 |
| JP | 5346728 A | 12/1993 |
| JP | 6293431 A | 10/1994 |
| JP | 2005327918 A | 11/2005 |
| JP | 2007136729 A | 6/2007 |
| JP | 2008149538 A | 7/2008 |
| JP | 2009533241 A | 9/2009 |
| JP | 2012201058 A | 10/2012 |
| JP | 2013078894 A | 5/2013 |
| JP | 2013123835 A | 6/2013 |
| JP | 2015-202882 A | 11/2015 |
| JP | 2016-57662 A | 4/2016 |
| JP | 2017121703 A | 7/2017 |
| KR | 20040027323 A | 4/2004 |
| RU | 2224955 C2 | 2/2004 |
| WO | 1997/027759 A1 | 8/1997 |
| WO | 1999013707 A1 | 3/1999 |
| WO | 2001/029748 A1 | 4/2001 |
| WO | 2004018217 A1 | 3/2004 |

OTHER PUBLICATIONS

International Search Report issued for PCT/US2020/048406, dated Nov. 26, 2020.
Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.
Office Action issued for related JP patent application Serial No. 2022-513619, dated Apr. 10, 2024, with English translation.
Office Action issued for related JP patent application Serial No. 2022-513621, dated Sep. 20, 2024, with English translation.
Office Action issued for related JP patent application Serial No. 2022-513633, dated Sep. 19, 2024, with English translation.
Office Action issued for related JP patent application Serial No. 2023-137015, dated Oct. 3, 2024, with English translation.

* cited by examiner

DELIVERY TRAY FOR FOOD PRODUCT PRINTER

CROSS-REFERENCE TO RELATED APPLICATION

The present application claims priority to and the benefit of U.S. provisional application Ser. No. 62/894,323, filed on Aug. 30, 2019, the content of which is hereby incorporated in its entirety.

BACKGROUND

Printing with edible ink on food products is done for purposes of identifying, marking, decorating, or personalizing the food product. For example, food products such as cookies can be passed under a print head ejecting edible ink on the top surface of the cookie, whether iced or plain, and printed with a selected design.

Currently, a conveyor belt system or tray is used where one or more cookies are spaced apart in an array on the conveyor belt or tray and passed below the print head of the printer. Alternatively, labels comprised of edible paper can be printed with edible ink and applied to a food item with an edible adhesive such as frosting or icing.

Systems of the prior art that are able to print images on an array of food products supported on a conveyor belt or a tray with two or more columns of food products requires a larger and more expensive printer on the scale of a commercial printer. Such systems also usually require sophisticated sensing systems to locate the position of each food item for printing.

In the prior art systems, the loading and unloading of a food product on a tray or conveyor during printing is generally impractical. The conveyor or tray are often not accessible while products are being printed. It is also difficult to accurately load a food product on a moving conveyor or tray. It is also difficult to load a food product on a moving conveyor or tray without adversely affecting the print quality of the image currently being printed.

SUMMARY

An aspect of the present disclosure relates to a delivery tray for automatically delivering food product to a printer for printing on a surface of the food product. The tray has a main body having a plurality of food product support surfaces spaced apart on the main body and each food product support surface is configured for supporting one of a plurality of food products thereon. The main body further has at least one positioning mechanism corresponding to each of the plurality of food product support surfaces and each positioning mechanism comprising at least one positioning element for guiding the loading of at least one of the plurality of food products onto the delivery tray.

In one or more embodiments, the at least one positioning element of each positioning mechanism has a ⅛ inch radius at a joint between the positioning element and the main body of the delivery tray and wherein the at least one positioning element protrudes upwardly from a top surface of the main body.

In one or more embodiments, each positioning mechanism comprises two positioning elements provided in a pair.

In one or more embodiments, the food product support surfaces comprise one or more support sides for holding one or more sides of the food product and an opening therebetween, where at least one positioning element is provided on at least one of the one or more support sides for each support surface.

The delivery tray is constructed from a food-grade material comprising a metal such as stainless steel, a plastic material, or a combination thereof.

The delivery tray also has one or more mechanisms for engaging with a drive mechanism of a tray base for moving the delivery tray between adjacent food product support surfaces.

In one or more embodiments, the one or more mechanisms for engaging with the drive mechanism of the tray base comprise one or more receiving configured to removably couple to one or more drive posts of the drive mechanism of the elements tray base.

In one or more embodiments, a center locating element on the tray is provided and configured to removably couple to a locating element of the tray base for laterally locating the tray connected to the tray base.

In one or more embodiments, the one or more mechanisms for engaging with a drive mechanism of a tray base comprise one or more concave surfaces, apertures, or combinations thereof for removably coupling to the one or more drive posts of the drive mechanism of the tray base.

Another aspect of the present disclosure relates to a system for printing on a surface of a plurality of food products. The system has a printer configured to print on a surface of a food product and a delivery tray spaced apart from the printer and having a plurality of food product holders spaced apart on the delivery tray and each holder configured for supporting one of the plurality of food products thereon and a positioning mechanism for loading food products onto the tray and positioning the food product accurately on each holder. The delivery tray is configured for movement such that the delivery tray automatically and continuously delivers unprinted food product to the printer for printing on a surface thereof.

A base is provided for operably supporting the delivery tray in a position spaced apart from the printer.

In one or more embodiments, the delivery tray is a rotatable delivery tray.

Each holder of the delivery tray has one or more support sides for holding one or more sides of the food product and an opening therebetween exposing a bottom surface of the food product.

The plurality of food products are edible elements having a substantially flat surface, cookies, frosting sheets, rice paper, or combinations thereof.

Movement of the delivery tray about the tray base is synchronized with the printing of the food products in a sequential manner.

Yet another aspect of the present disclosure relates to positioning a first food product on a first food product support surface of a delivery tray and guiding the first food product onto a selected position of the first support surface, the selected position bounded on one or more sides by a positioning mechanism located adjacent the first food product support surface of the delivery tray. The delivery tray is automatically advanced from the first food product support surface to a second food product support surface and a second food product is positioned on the second food product support surface of the delivery tray along with guiding the second food product onto a selected position of the second support surface, the selected position bounded on one or more sides by a positioning mechanism located adjacent the second food product support surface of the delivery tray.

In one or more embodiments, the delivery tray is coupled to a motorized base for automatically advancing the delivery tray wherein one or more receiving elements on the delivery tray couple to corresponding elements on the motorized based for locating and leveling the delivery tray on the motorized base.

DETAILED DESCRIPTION

Figure 1:
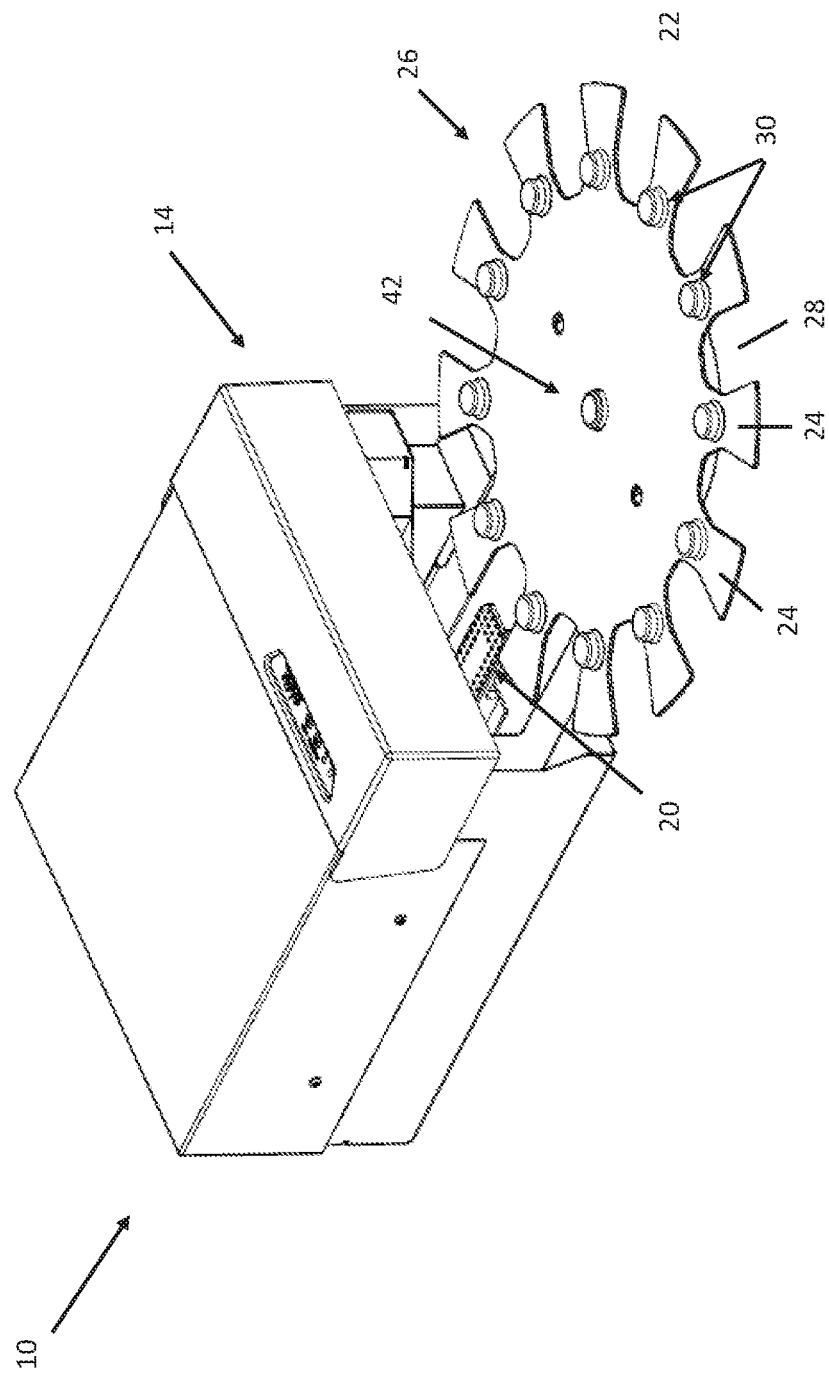
FIG. 1 is a perspective view of a food product printing system.
Figure 2:
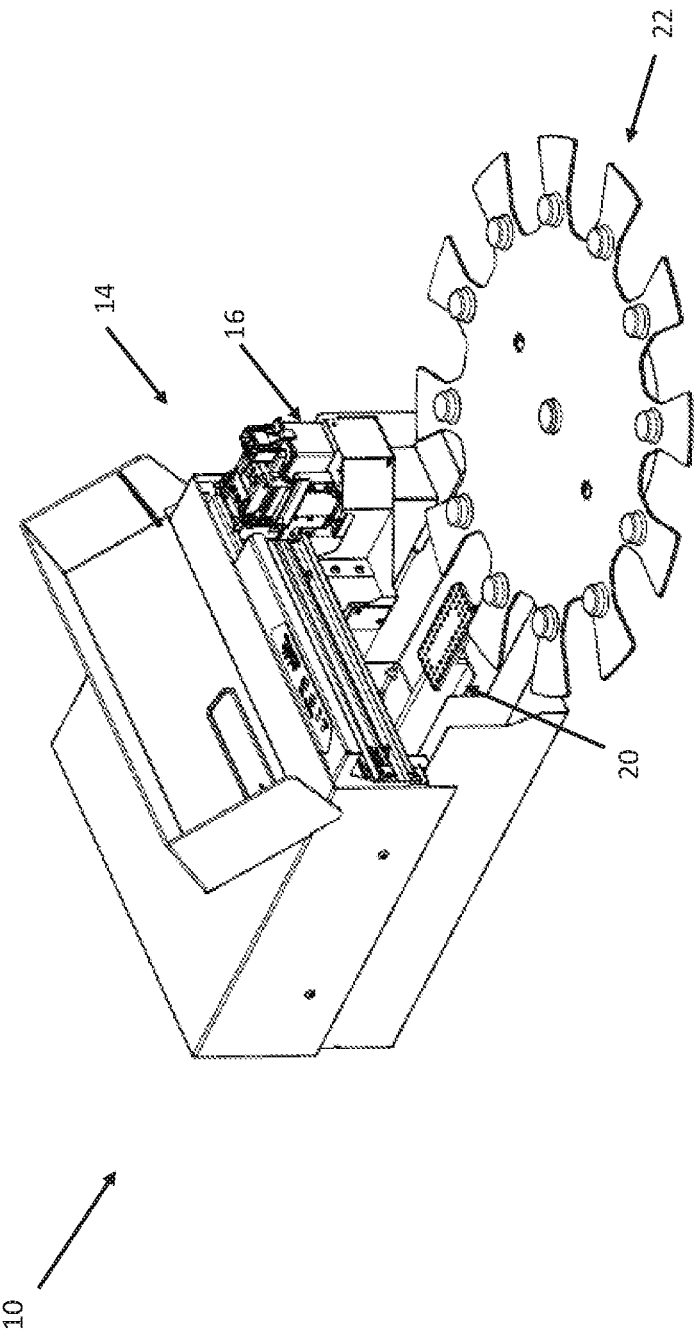
FIG. 2 is a perspective view of a food product printing system with a cover portion opened for exposing interior portions of a printer portion of the system.
Figure 3:
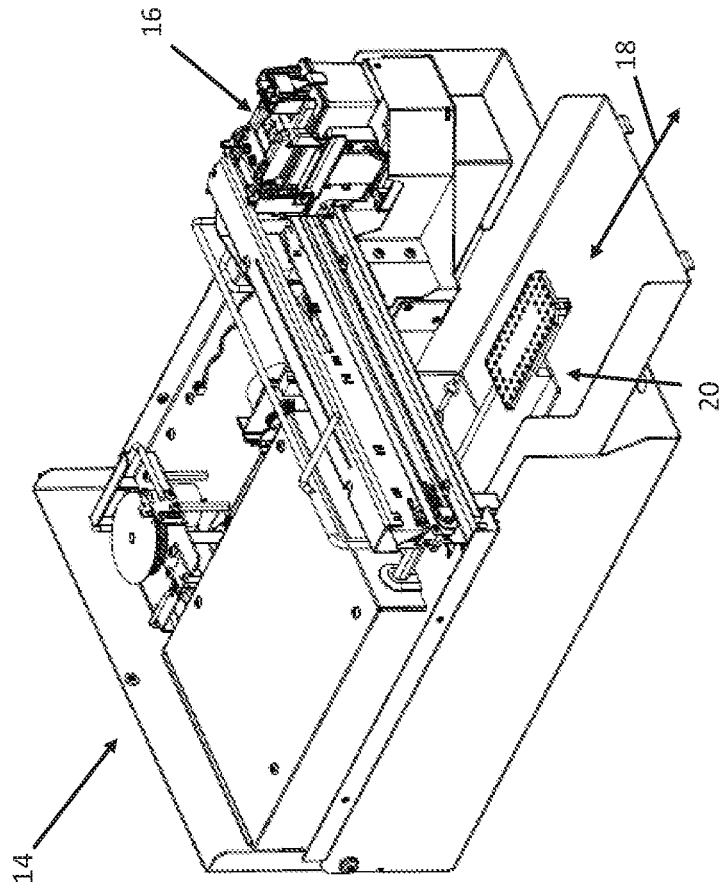
FIG. 3 is a top perspective view of the food product printing system having an automatic delivery tray component removed and a cover of a printer removed.

A food product printing system of the present disclosure includes a printer system for printing an image on a surface of the food product. The print surface may be an actual surface of the food product itself. The printer system comprises a printer having a receiving arm and a delivery tray supported on a base. The system may also be provided with a plurality of different delivery trays, each tray configured for continuous delivery of a varied number of food products, and/or for food products of different or specific dimensions.

The receiving arm is configured for receiving a food product from the delivery tray and moving the food product from the delivery tray into the printer and into a printing position. The printing position is substantially below a print head of the printer such that the surface to be printed on is in the path of the print head. Once the food product is printed, the receiving arm then returns the printed food product to the delivery tray. The delivery tray is also configured to move in one or more directions to continuously and automatically deliver a plurality of food items sequentially to the receiving arm.

One embodiment of the printing system 10 is illustrated generally in FIGS. 1-8. The printing system 10 is configured to receive a food product 12 from a delivery tray 22, to print on a surface of the food product 12 and return the food product 12 to the delivery tray 22. The system is also configured to do so automatically and continuously for a pre-determined number of food items. The system 10 comprises a printer 14 having a print head 16 and nozzles (not shown) wherein the print head 16 and nozzles are configured for printing with edible ink. The printer 14 also supports an extendable and retractable receiving arm 20.

The receiving arm 20 is operably connected to a power source within the printer 14. The receiving arm 20 is extendable and retractable with respect to the position of the path of the print head 16. The receiving arm 20 has a first end and a second opposing end and a substantially flat receiving surface extending therebetween. The first end is operably connected to a mechanism for retracting and extending the arm 20. The second end and at least a portion of the receiving surface of the receiving arm 20 are configured for extending outwardly from the printer 14. When extended, the receiving arm 20 may receive a food product, hold a food product, and/or return a printed food product to the delivery tray 22. The receiving arm also holds or supports the food product within the printer 14 and during printing on the surface of the food product 12.

With respect to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller wherein software may be used to control printing of the content on one or a plurality of food products.

In further detail, the receiving arm 20 moves in a direction perpendicular to the print head path such that the receiving arm 20 extends and retracts across or through the path of the print head 16. In one embodiment, the receiving arm 20 is a substantially flat, rectangular support plate which extends towards a holder 26 of the delivery tray 22 in order to engage with and remove the food product 12 from the delivery tray 22 as well as to return printed food products to the delivery tray. A top surface of the receiving arm 20 is a receiving surface for food product and may be textured or otherwise provided with a surface to increase a co-efficient of friction between the receiving arm 20 and the food product for retaining the food product on the arm 20.

The receiving arm extends to receive or return the food product 12 and retracts from the tray 22 into the printer 14 and into a position below the print head 16 for printing. Once content is printed on a food product, the receiving arm 20 then extends to return the food product 12 back to the delivery tray 22. The delivery tray 22 then advances to provide a second unprinted food product 12 to the receiving arm 20. The receiving arm 20 is also configured for vertical movement such that the receiving surface of the receiving arm 20 is movable between two positions, a raised and a lowered position, where these positions allow the receiving arm 20 to retrieve and return food products 12 with respect to the delivery tray 22, and may allow for advancing of the delivery tray 22 when the receiving arm 20 is extended. Once loaded, the receiving arm 20 is then retracted to the printing position with the food product 12 thereon. This process continues on continuously and automatically until a pre-determined amount of food products are printed. It is also contemplated that the delivery tray may also be raised or lowered in order to allow for the delivery tray 22 to advance to a subsequent holder 26 or opening 28 on the delivery tray 22 for automatically delivering, receiving and thus printing on a plurality of food items.

Figure 4:
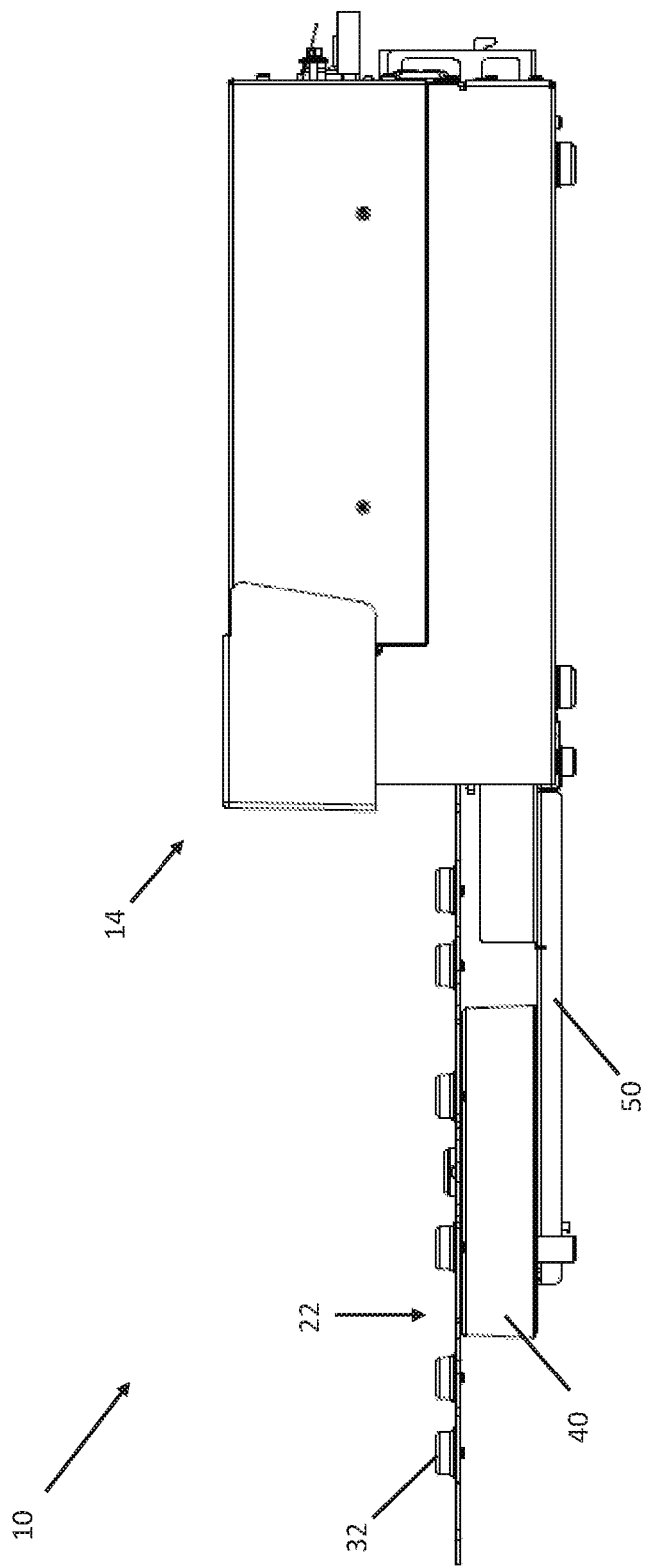
FIG. 4 is a side view of the food product printing system with the automatic delivery tray component removably secured to a tray base portion.
Figure 8:
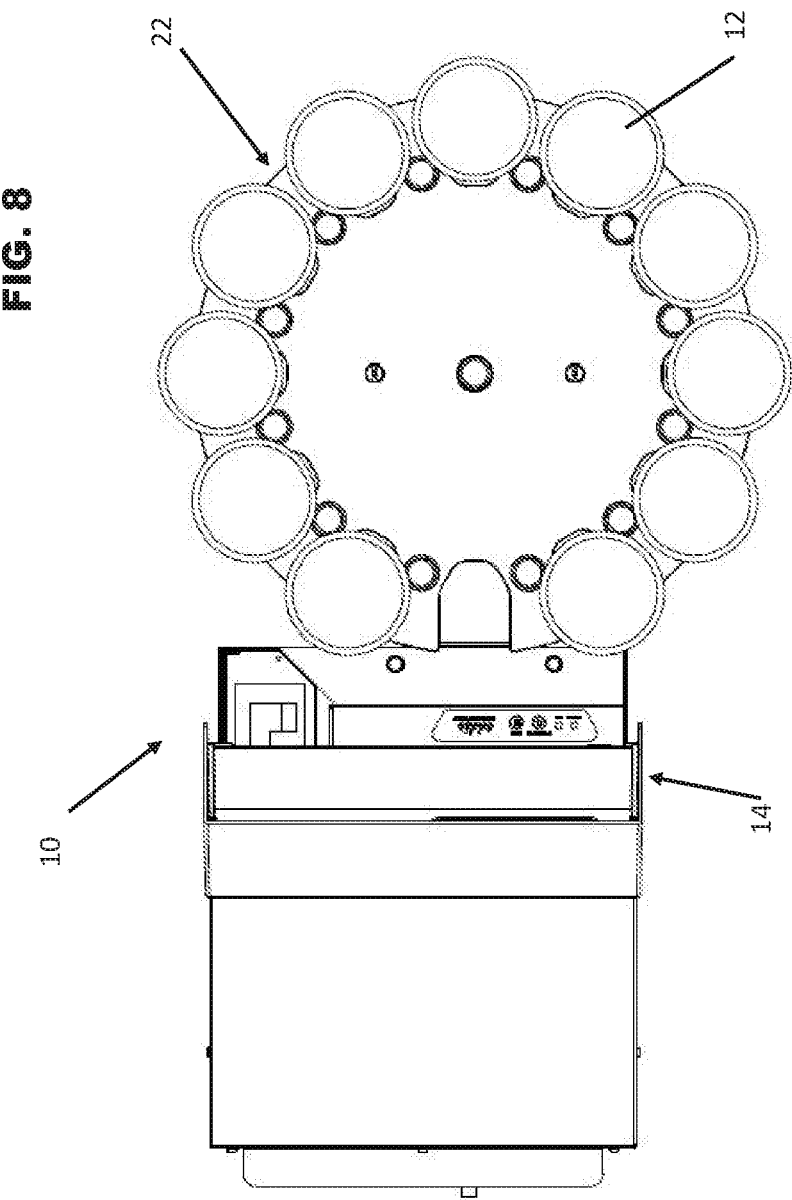
FIG. 8 is a top view of the food product printing system with food product for printing loaded thereon.

As illustrated in FIGS. 4 and 8, positioned adjacent or near the printing system is a tray base 40 for providing power and controlling advancement and vertical positioning of the delivery tray 22 that is removably coupled thereto. The base 40 is spaced apart from the printer 14 and may be removably connected to the printer 14 via a connecting arm 50 that extends from a housing of the base 40 to removable connection or coupling to a housing of the printer 14. The arm 50 also positions the base 40 at a selected distance from the printer 14 and receiving arm 20 so as to accommodate the delivery tray 22 supported thereon. The base 40 may also be operably connected to the controller and to the power supply of the printer 14 so as to control movement of the tray 22 in a manner synchronized with the printer 14.

Figure 6:
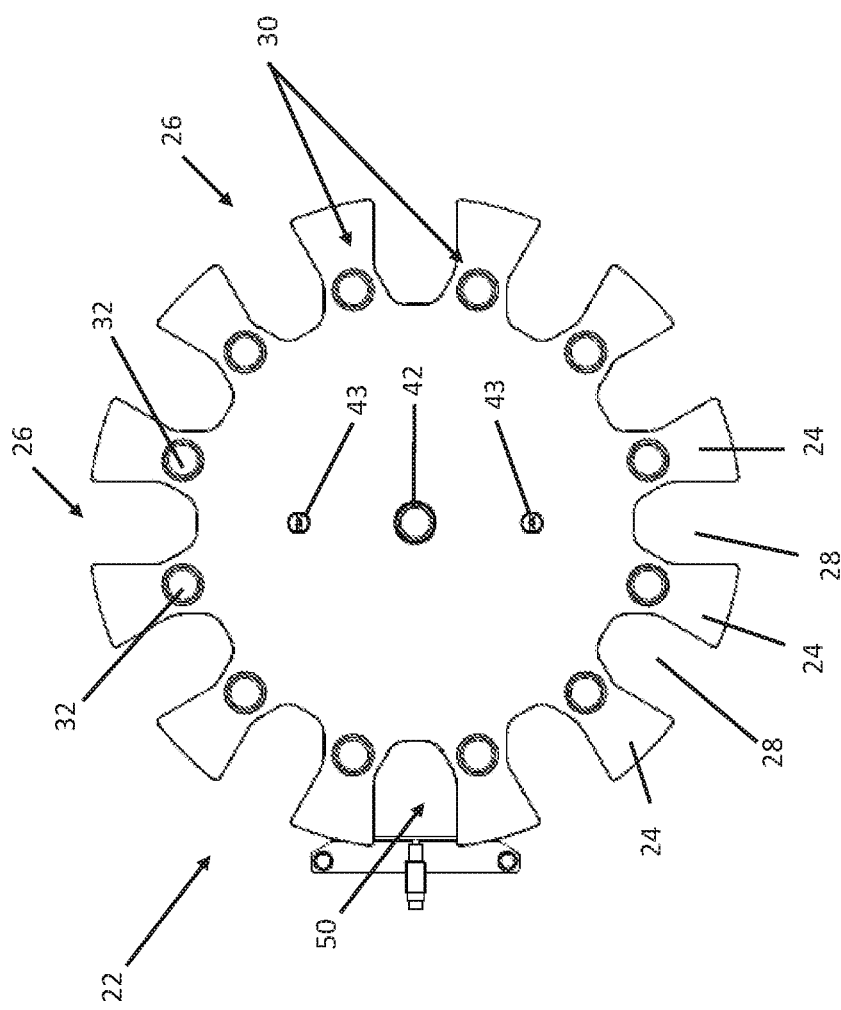
FIG. 6 is a top view of the tray secured on the base.
Figure 7:
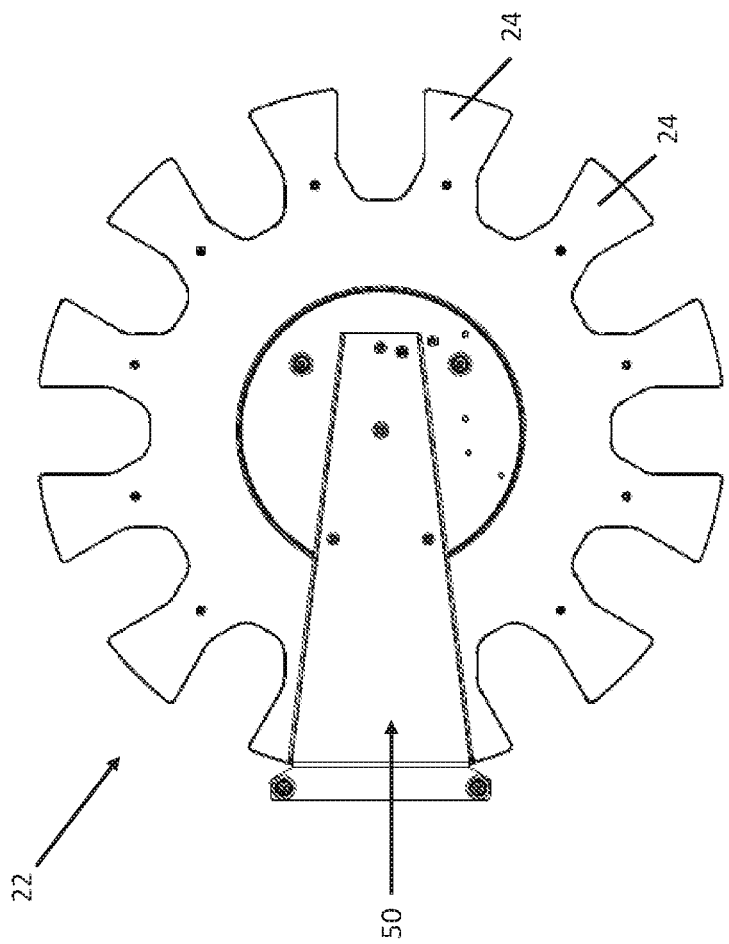
FIG. 7 is a bottom view of the tray secured on the base.

Referring to FIGS. 6-8, the delivery tray 22 is configured with a plurality of holders 26 as described in further detail below. Each holder 26 is configured to receive and support a food product 12 and deliver said food product 12 to the receiving arm 20. The delivery tray illustrated includes twelve (12) holders 26, however, trays for holding fewer or more food products are contemplated and within the scope of this disclosure. The number of holders on a tray may be adjusted based on the type or size of item being printed.

In further detail, in one embodiment, each holder 26 has two support sides 24 extending from a center area of the tray 22 and an opening 28 between these support sides 24. The food product is supported on the holder by way of resting on top of the two support sides 24 of the holder. The opening 28 between the sides 24 of the holder 26 is configured to receive the receiving arm 20 therein and allows for the receiving arm 20 to take a position for receiving and returning the food product to the delivery tray 22. That is, the receiving arm 20 can extend into this opening 28 and contact a bottom surface of the food product 12 that is supported on the sides 24 of the holder 26. The receiving arm 20 then supports the food product 12 thereon when retracting the food product 12 into the position for printing.

It is also contemplated and within the scope of this disclosure that each holder 26 of the tray 22 may comprise a single food product support surface in lieu of two support sides 24. Such a single food product support surface may comprise a narrow support surface for each food product, for example, in the manner of one support side 24. Thus, food products 12 are loaded onto the single food product support surface such that the food product 12 is positioned centrally on top of the single food product support surface. In such embodiments, the receiving arm 20 may then be provided with a platform having two opposing support sides and an open space therebetween. The open space provided for accepting the single food product support surface therebetween. In such an embodiment, the receiving arm 20 and platform extend to the tray 22 and the two support sides of the platform are positioned on opposing sides of the single food product support surface of the tray 22 for transferring food products between the platform and the tray 22.

In the embodiment illustrated, each holder 26 is configured to support or otherwise hold one or more sides, edges, or perimeter lengths of the food product 12 via contact of the support sides 24 with the bottom surface of the food product 12. The holders 26 may have one or more positioning mechanisms 30 for directing a position of the food product 12 when loaded onto the delivery tray 22. Positioning mechanisms 30 are provided, for example, on each of the support sides 24. Utilizing the positioning mechanisms 30 to set the position of the food product 12 during loading of the delivery tray 22 ensures delivery of the food product 12 to the receiving arm 20 such that the food product is balanced on and supported by the receiving arm 20 and ensures the surface of the food product is centered for printing of the content on the food product.

In one or more embodiments, the delivery tray 22 is provided with one or more positioning mechanisms 30, which may comprise for example, one or more positioning elements 32, which are strategically and selectively positioned on the tray 22 to allow for ease in loading and un-loading food products 12 on the delivery tray 22. The elements 32 can be posts, arms, or other mechanisms configured to provide a visual or tactile indicator of position of a food product 12 loaded onto the tray 22. In the non-limiting example of the illustrated embodiment, the elements 32 protrude upwardly from connection with the tray 22 and are configured to mark the placement location for a food product 12 on the delivery tray 22. Additionally, the positioning elements 32 also serve as guides for loading and positioning the food product 12 onto the tray, as the food product is loaded on to the tray 22, for example. The positioning elements 32 serve as guides for fast and efficient loading and positioning of the food product when the food product is pushed, slid, or placed on the holder 26 of the delivery tray 22. The guides limit and guide the position of the food product, preventing the food product from taking position on the tray 22 not aligned with a holder 26. The elements 32 may be provided in pairs which protrude from a location on a corresponding one of the support sides 24 of each holder 26. The tray 22 may comprise alternative positionings for the elements 32 in order to accommodate food products 12 of different sizes, shapes, and types. For example, the elements 32 are positioned on the tray 22 such that a forward and/or side surface of the food item contacts and abuts the elements 32 to ensure sufficient placement for delivery to the receiving arm 20 when the food product 12 is placed on the holder 26.

The positioning mechanisms 30 allow for sufficiently accurate and easy loading of the tray with unprinted food product such that food product received on the delivery tray 22 is accurately delivered to a reciprocal position on the receiving arm 20 selected for printing. In some embodiments, this can eliminate the need for a sensors or other mechanism to detect the position of the food product on the receiving arm for printing.

Loading of the delivery tray 22 with unprinted food product 12 can be done manually or in an automatic manner. As such, the system can be used with a conveyor or other automatic arm or other automated delivery system for delivering unprinted food product 12 to the delivery tray 22 and/or removing the printed product 12 from the delivery tray 22.

In one or more embodiments, the positioning mechanisms 30 comprise one or more positioning elements 32 having about a ⅛" radius at the point where the element joins or meets the surface of the delivery tray which allows for easy cleaning of the tray 22 per NSF standards.

The delivery tray 22 advances about the openings 28 such that the delivery tray 22 advances from one opening 28 to the next adjacent opening 28 automatically after a food product 12 has been returned to the tray 22 by the receiving arm 20. For example, in the embodiment illustrated, the delivery tray 22 is a generally round tray that is rotatable about its center to advance the position of the holders 26 with respect to delivery of subsequent food products 12 to the receiving arm 20. The holders 26 are spaced apart around the perimeter of the delivery tray 22. The delivery tray 22 and base 40 may be a carousel for continuous delivery, loading and reloading of unprinted food products after printed food products have been returned to the delivery tray 22 and subsequently removed. While a rotatable tray is illustrated herein, the delivery tray 22 may also be linearly advanced, move in multiple directions, or move in the manner of a conveyor belt, by way of non-limiting examples. That is, once printed and returned to the delivery tray 22 as the delivery tray 22 advances to the next adjacent opening 28 for purposes of delivering one or more subsequent food products 12 to the printer 14, the printed and advanced food product may be removed and a new unprinted food product 12 placed on the tray 22. Thus, delivery of unprinted food products and receipt of said food products after printing can be essentially endless, limited only by supply or selection of a predetermined amount to be printed, for example.

As described previously, the holders 26 are generally spaced apart around the perimeter of the delivery tray 22 and the holders 26 have dimensions which allow the position of the food product 12 to be loaded onto the tray 22 in a known position. When the food product 12 is delivered to the receiving arm 20, the position of the food product 12 print surface with respect to the print head 16 is known when the receiving arm 20 is retracted. This allows for the elimination of sensors or other position or item detecting means and eliminates other delays due to location or position detection before printing. Instead, upon retraction of the receiving arm 20, printing can begin. This allows the automated process to proceed continuously and efficiently at an increased speed.

The delivery tray 22 moves about an operable connection with a base 40. The delivery tray 22 may rotate or advance in a linear manner, or other directional movement which advances the delivery tray from one opening 28 to the next adjacent opening 28. In one non-limiting embodiment, as illustrated, the delivery tray 22 rotates about the operable connection with the base 40.

Figure 5:
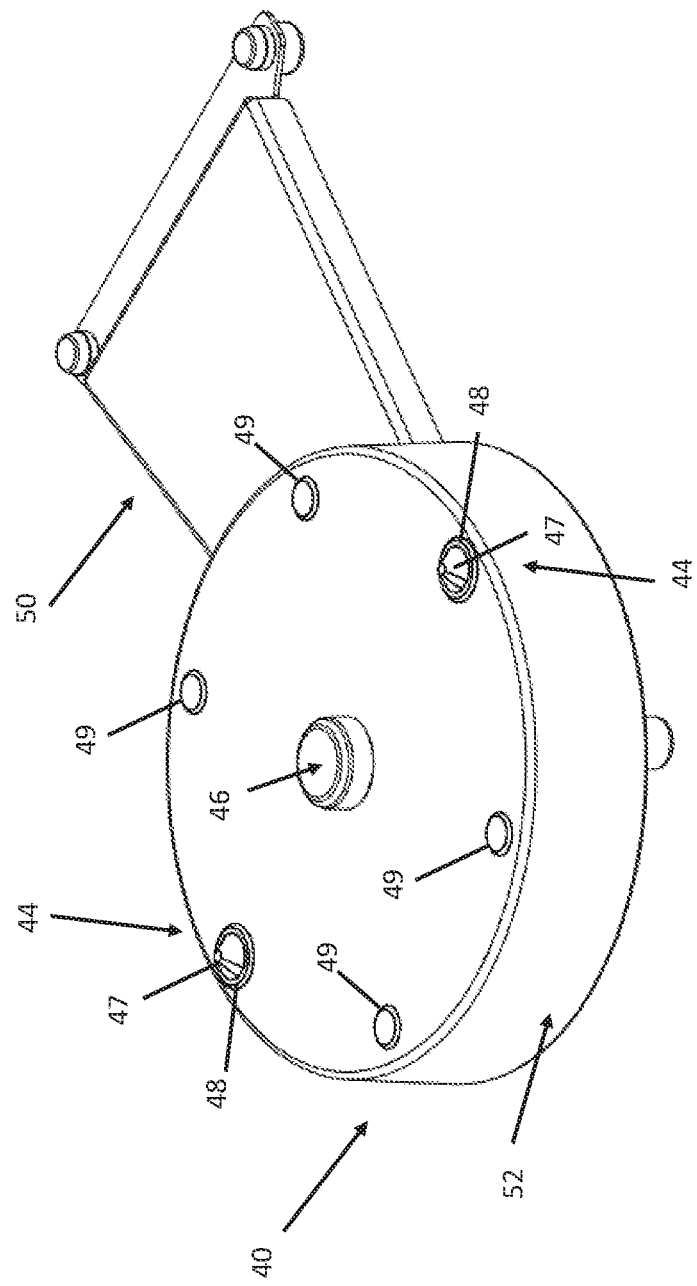
FIG. 5 is a perspective view of the tray base portion.

Referring to FIGS. 5-7, the delivery tray 22 is operably, and removably connectable to the base 40 about one or more connectors or receiving mechanisms 43 positioned on the delivery tray 22. These connector(s) 43 may comprise one or more drive posts 47 that both drive the rotation of the delivery tray 22 and locate the delivery tray 22 relative to the base 40 in the direction of rotation. The tray 22 may additionally further comprise another receiving element 42, which can be positioned in a center area of the tray 22, where the receiving element 42 connects to a locating element 46 of the base 40. In embodiments where the receiving element 42 and locating element 46 are provided, in addition to the one or more connectors 43 and drive posts 47, the locating element 46 locates the delivery tray 22 laterally relative to the base 40. In embodiments where the locating element 46 and corresponding receiving element 42 of the tray 22 are not present, the one or more drive posts 47 may be used to also locate the delivery tray 22 laterally relative to the base 40.

Each of the one or more drive posts 47 may be provided with a shoulder 48 that is positioned at substantially the same level or height as a plurality of support pads 49 spaced around the outside of the base 40. For example, the support pads 49 and the shoulder 48 of each drive post 47 combine to support the delivery tray 22 in a level position on the tray base 40. In the embodiment illustrated, four support pads 49 are provided on the base 40 and contact a surface of the tray 22 for supporting and leveling.

The connectors 42 and/or 43 of the delivery tray 22 may be concave members with respect to a bottom surface of the tray and thus convex portions on a top surface of the tray 22. These openings 42 and 43 have interior surfaces that are configured to mate with and/or receive and engage with the respective locating post 46 and/or drive posts 47. The locating post and/or drive posts may also have tapered surfaces thereon which support proper installation of the tray 22 with ease and in a more efficient (e.g., faster) manner. Such a connection between the locating post 46 and/or drive posts 47 and the corresponding connectors 42 and/or 43 further allows the tray 22 to generally or substantially maintain rotation when inadvertently bumped.

A drivetrain is provided within a housing 52 of the base 40 and is connected to the power source of the printer. The connection mechanism between the tray 22 and base 40 allows the tray to be quickly installed on the base 40 without tools. The tray 22 is configured to be placed on the base 40 with complimentary mating of the base and tray components of the connection mechanism. This system allows various delivery trays 22 of different dimensions and arrangements for holding food products 12 to moveably connect with the base 40 with the same type of connection mechanism. While the above interface is described, alternative interfaces and non-locking mechanisms for transferring movement generated at the base 40 to the tray 22 for controlled advancement of the delivery tray 22 are contemplated.

The base 40 may comprise its own power source for providing rotational power that is transferred from the base 40 to the delivery tray 22, or the base 40 may be operably connected to the power source of the printer 10. Thus, when the delivery tray 22 is positioned on and in connection with the base 40 as described above, the tray 22 rotates as controlled by the base 40. The base 40 is also in communication with the controller which controls extension and retraction of the receiving arm 20 and printing of an image on a received food product 12 such that the rotation of the delivery tray is synchronized with the extension and/or retraction of the receiving arm 20.

In the embodiment illustrated, the base 40 provides the power to rotate the delivery tray 22 between various positions which include alignment of a first and one or more subsequent openings 28 with the extended receiving arm 20 as well as rotating the delivery tray 22 to advance the delivery tray 22 to a next opening 28 while the receiving arm 20 is extended. In embodiments where the delivery tray 22 may be in one of two positions, the raised or lowered position, depending on whether an item is to be delivered or returned to the tray 22 and to prevent the receiving arm 20 from interfering with advancing or rotation of the delivery tray 22, the base 40 the also allows for moving the delivery tray 22 between the two positions and thus is configured to raise and lower the tray or tilt the tray 22 upwardly or downwardly at the opening 28 positioned for delivery or return of the food product 12. In such an embodiment, as the receiving arm 20 is extended and positioned in the opening 28, the upper surface of the receiving arm 20 may be substantially level to the top surface of the delivery tray 22. To ensure or facilitate delivery of the food product 12 supported on the delivery tray 22, the delivery tray 22 is downwardly tilted or lowered in the direction of the receiving arm 20. This allows the receiving arm 20 to contact and support a bottom surface of the food product 12 and remove support by the delivery tray 22 thereby transferring the food product 12 to the receiving arm 20. Conversely, when the receiving arm 20 is returning a food product after printing thereon, the delivery tray 22 may be provided in a lowered position and then tilted upwardly or raised after the receiving arm 20 supporting the printed-on food item is extended into opening 28. This allows the holder 26 to lift the food product off the receiving arm 20 for removal from the printing queue.

In the illustrated embodiment the food product is a dessert item such as a cookie. However, while examples of food items include various shapes, sizes, and types of cookies, the food items that can be printed with this system are not so limited. Frosting sheets, rice paper, bakery goods having at least one substantially flat surface for printing an image thereon, and other food items may be printed using this system. The delivery tray may be configured with positioning mechanisms which are tailored to the specific shape, size, thickness, type, etc. of food product to be printed and thus, the system may be provided as a kit including the printer described herein including receiving arm and one or more delivery trays of various sizes, dimensions and for delivery of one or more different food products or food products having different dimensions.

The system is further configured with one or more control boards in communication with a computer or controller for configuring and initiating the printing process. However, the delivery tray is configured with one or more positioning mechanisms such that in combination with the receiving arm as a food product is delivered to the printer and positioned below the print head, the need for a sensing system or series of sensors for detecting the position of the food product is eliminated. A sensor may be utilized in the printer for confirming the presence of the food product in the printer for printing. The sensors may be positioned on the print head and used to detect only the presence of the substrate for printing. The system is a fixed spot printing system so there is no need for scanning for position of the print surface. The system also allows for loading of unprinted food products and unloading of printed food products during printing or otherwise "on the fly." The control board or boards allow for the delivery of a first food product, printing of the first food product, return of the first food product, advancing of the delivery tray to provide a second food product for delivery, delivery of the second food product, printing of the second food product, return of the second food product to the delivery tray and advancing for delivery of one or more subsequent food products for printing and return. Thus, the system allows for the automatic delivery, printing on and return of a plurality of food products.

Although the present disclosure has been described with reference to preferred embodiments, workers skilled in the art will recognize that changes may be made in form and detail without departing from the spirit and scope of the disclosure.

The invention claimed is:

1. A system for printing on a surface of a plurality of food products, the system comprising:
   a printer configured to print on a surface of a food product and having an extending arm configured to extend from and retract into a housing of the printer; and
   a delivery tray spaced apart from the printer and having a plurality of food product holders spaced apart on the delivery tray and each holder configured for supporting one of the plurality of food products thereon, each food product holder comprising a pair of flat surfaces spaced apart and configured to support one or more perimeter surfaces of the food product thereon, wherein the space between each flat surface of the pair of flat surfaces is open and is configured for positioning below the food product supported on the holder and exposing a bottom surface of the food product as the space between each flat surface is configured to receive the extending arm of the printer to remove the respective food product from the delivery tray before printing thereon; and
   a positioning mechanism spaced apart from the pair of flat surfaces of the holder for loading food products onto the delivery tray and positioning the food product accurately on each holder, and wherein the delivery tray is configured for movement such that the delivery tray automatically and continuously delivers unprinted food product to the extending arm of the printer for printing on a surface thereof.

2. The system of claim 1, and further comprising a base for operably supporting the delivery tray in a position spaced apart from the printer.

3. The system of claim 1, wherein the delivery tray is a rotatable delivery tray.

4. The system of claim 1, wherein the delivery tray is constructed from a material comprising a metal, stainless steel, or a plastic material.

5. The system of claim 1, wherein the plurality of food products are edible elements having a flat surface, cookies, frosting sheets, rice paper, or combinations thereof.

6. The system of claim 2, wherein movement of the delivery tray about the base is synchronized with the printing of the food products in a sequential manner.

* * * * *